United States Patent
Pizzio et al.

(10) Patent No.: US 9,995,356 B2
(45) Date of Patent: Jun. 12, 2018

(54) BACK PLATE FOR A BRAKE PAD OF A DISC BRAKE ASSEMBLY AND MANUFACTURING METHOD THEREOF

(71) Applicant: UTIL INDUSTRIES S.P.A., Villanova d'Asti (AT) (IT)

(72) Inventors: Rodolfo Pizzio, Villanova D'Asti (AT) (IT); Raffaele Gabriele Vironda, Villanova D'Asti (AT) (IT); Francesco Rangoni, Villanova D'Asti (AT) (IT)

(73) Assignee: Util Industries S.p.A., Villanova D'Asti (AT) (IT)

( * ) Notice: Subject to any disclaimer, the term of this patent is extended or adjusted under 35 U.S.C. 154(b) by 0 days. days.

(21) Appl. No.: 15/032,732

(22) PCT Filed: Oct. 30, 2014

(86) PCT No.: PCT/IB2014/065706
§ 371 (c)(1),
(2) Date: Apr. 28, 2016

(87) PCT Pub. No.: WO2015/063713
PCT Pub. Date: May 7, 2015

(65) Prior Publication Data
US 2016/0281811 A1    Sep. 29, 2016

(30) Foreign Application Priority Data

Oct. 31, 2013 (IT) .............................. TO2013A0878

(51) Int. Cl.
| F16D 69/04 | (2006.01) |
| F16D 65/095 | (2006.01) |
| F16D 65/092 | (2006.01) |

(52) U.S. Cl.
CPC ....... *F16D 69/0408* (2013.01); *F16D 65/092* (2013.01); *F16D 65/095* (2013.01);
(Continued)

(58) Field of Classification Search
CPC .................. F16D 69/04; F16D 69/048; F16D 2069/0425; F16D 2069/0441; F16D 2069/0483; F16D 65/092; F16D 65/095
See application file for complete search history.

(56) References Cited

U.S. PATENT DOCUMENTS

| 6,431,331 B1 | 8/2002 | Arbesman |
| 6,464,047 B1 | 10/2002 | Arbesman |

(Continued)

FOREIGN PATENT DOCUMENTS

CA      2597493 A1    8/2006

*Primary Examiner* — Anna M Momper
(74) *Attorney, Agent, or Firm* — Howson & Howson LLP

(57) ABSTRACT

A back plate for a brake pad of a disc brake assembly is provided. The back plate comprises a plate body provided with a pair of opposite surfaces and lateral flanks. An engaging portion is defined on a first one of the surfaces, delimited by a corresponding perimeter, and adapted to receive a friction material. The engaging portion is provided with at least a first series of rectilinear parallel rows of retaining elements for the friction material. Each row comprises a plurality of grooves associated to corresponding protrusions. The protrusions are provided with a proximal end integrally connected to the material of the plate body and a free distal end. For each row of the at least first series of rows, a distance measured along the axis of each row between the mutually adjacent retaining elements closest to the perimeter of the engaging portion and the perimeter is constant.

4 Claims, 6 Drawing Sheets

(52) U.S. Cl.
CPC ............ *F16D 2069/0441* (2013.01); *F16D 2069/0483* (2013.01); *F16D 2069/0491* (2013.01)

(56) References Cited

U.S. PATENT DOCUMENTS

| | | |
|---|---|---|
| 6,843,095 B2 * | 1/2005 | Arbesman .................. B21J 5/12 72/325 |
| 7,222,701 B2 | 5/2007 | Pham |
| 7,249,483 B2 | 7/2007 | Pham |
| 9,291,225 B2 * | 3/2016 | Arbesman ............. F16D 65/092 |
| 2006/0180414 A1 | 8/2006 | Jung |
| 2010/0170758 A1 * | 7/2010 | Chen .................... F16D 65/092 188/250 G |

\* cited by examiner

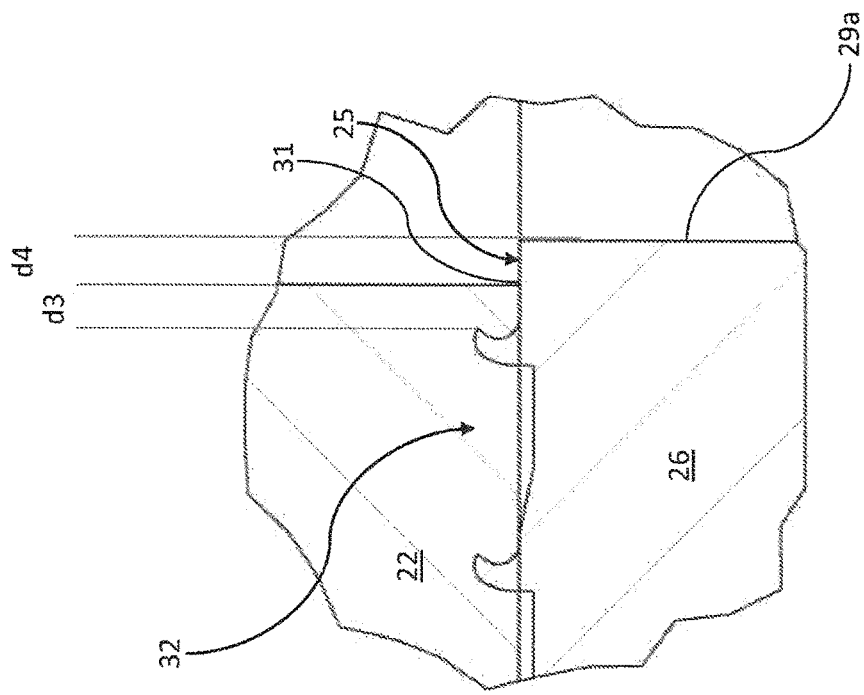
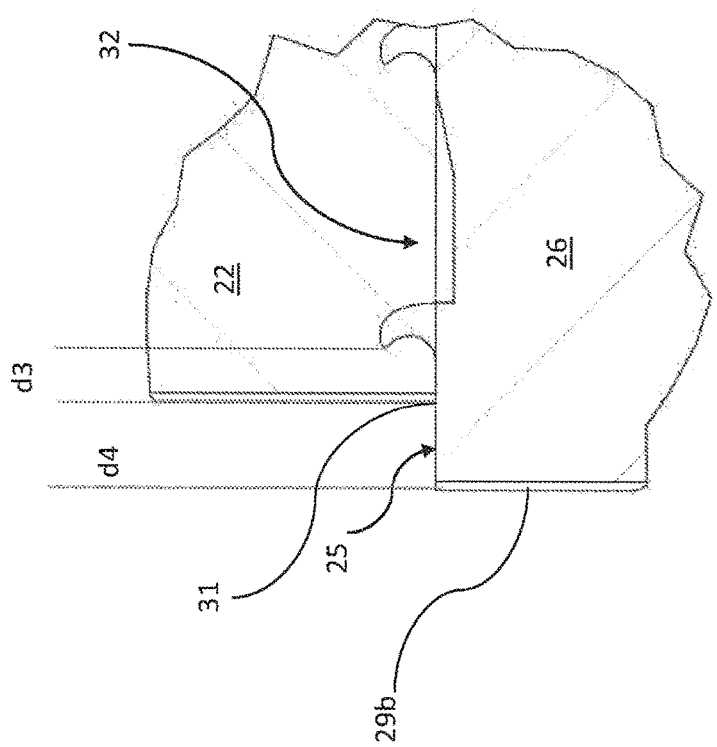
Fig.7B
Fig.7A

BACK PLATE FOR A BRAKE PAD OF A DISC BRAKE ASSEMBLY AND MANUFACTURING METHOD THEREOF

TECHNICAL FIELD

The present invention refers to a back plate for a brake pad of a disc brake assembly as well as to a method for the manufacturing thereof.

The back plate according to the invention is adapted to be used in particular, though not exclusively, for the making of brake pads for disc brakes in the field of land vehicles.

BACKGROUND ART

As is known, disc brake assemblies, for instance used on land vehicles, incorporate brake pads in which a layer of friction material is provided.

Conventionally, brake pads are made starting from a metal back plate on which a surface adapted to receive the friction material is defined.

Back plates for brake pads usually have irregular shapes and their size in the plane of the back plate, in longitudinal direction, i.e. in the direction tangent to the trajectory of the circular motion of the disc to which the back plates are to be applied, is greater than the size in transverse direction, i.e. in the direction perpendicular to said longitudinal direction.

The friction material is applied to the surface of the back plate at a predefined engaging portion which usually takes up most of the area available on said surface. This engaging portion is also usually surrounded, without interruption, by a free peripheral zone, i.e. a zone intended not to be covered by the friction material.

The peripheral zone, free from the friction material, is necessary mainly for working requirements. The width of the free zone is usually kept to the bare minimum, as it is disadvantageous, mainly for reasons of weight, that the surface of the back plate to which the friction material is applied has an area bigger than the area effective for the braking effect.

The minimum width of said free zone, usually measured along the longitudinal flanks of the back plate, can vary from some tenths of millimeter to some millimeters.

During operation of the brake assembly, i.e. during braking, the brake pad is brought against the disc along a direction substantially perpendicular to the surface of the rotating disc. During braking the layer of friction material with which the brake pad is provided is exposed to forces that are mainly tangential with respect to the circular motion of the disc, said forces developing in the plane of the brake pad parallel to the disc and tending to remove the friction material from the back plate. In addition to these forces, there are also other forces that are directed in several directions, particularly perpendicularly to the surface of the brake pad, and are caused by the vibrations generated during action of the brake pad on the disc and as a consequence of possible alignment errors of the parts in relative motion. Furthermore, part of the kinetic energy of the disc turns into heat during braking. The heat generated during braking usually causes an increase in the temperature of the materials of which the brake pad is made. The increase in temperature may cause weakening of the bonds that hold the friction material on the back plate.

The more the braking action to be exerted by the brake assembly onto the rotating disc is, the stronger the forces acting on the friction material during braking are. When such forces overcome the counter-forces holding the fiction material adhering to the back plate, detachment and destruction of the friction material or of part thereof occur, thus causing jeopardy to or loss of the braking effect.

The back plate, the friction material and the method for their manufacturing therefore have to be devised by taking into account the stresses to which the brake pad is exposed when in use.

In order to increase adhesion of the friction material to the traditionally smooth surface of the back plate, back plates were proposed in the past which are provided with retaining elements, each of said elements consisting of a groove and a corresponding protrusion integrated on the surface of the back plate having to receive the friction material.

According to prior art, the protrusions are obtained by making grooves in the material of the surface of the back plate and lifting from said surface the material removed from the groove, without, however, removing it entirely from the body of the back plate.

With this technique back plates for brake pads are nowadays manufactured which are provided with a plurality of protrusions of different shape and size, for instance curl-shaped protrusions.

U.S. Pat. Nos. 7,222,701 and 7,249,483 describe examples of back plates provided with retaining elements of the aforementioned kind.

The methods currently used for manufacturing retaining elements of the kind provided with grooves and engagement protrusions on the surface of the back plates, however, do not allow to obtain an optimal distribution of the retaining elements. It may happen, for instance, that too large areas of the surface of the back plate to which the friction material is to be applied remain free of retaining elements.

It is therefore a first object of the invention to overcome this drawback by providing a back plate in which the distribution of grooves and protrusions is optimized as a function of the forces applied to the brake pad when the latter acts against the disc of a brake assembly for stopping rotation thereof.

Retaining element are currently distributed mostly randomly over the surface of the back plate, often by giving priority to working requirements rather than to the requirements of the products to be obtained. This disadvantageous condition occurs in particular in the proximity of the perimeter delimiting the engaging portion, defined on the surface of the back plate, which is intended for receiving the friction material.

Nowadays retaining elements are made on the surface of the back plate, usually by means of a mechanized equipment having a plurality of parallel tools provided with teeth or cutting edges. The tools cut the material of the back plate thus creating corresponding grooves. The material lifted by the tools during the making of the grooves is brought over the plane of the surface of the back plate until it forms as many engagement protrusions, typically in the form of curls or shavings.

A first kind of known equipment provides that the tools are arranged mutually parallel and act on the back plate by approaching the back plate all from the same lateral flank. It is clear that in this case the opposite lateral flank of the back plate will have to be kept firmly in abutment against a fixed counter-surface. This method has the drawback that forces of high intensity are applied along the flank of the back plate opposite to the advance direction of the tools. The lateral flanks of the back plates follow a usually irregular contour that may often include a series of rectilinear sections, variously inclined sections, curved sections, concave or convex sections. Therefore clearances may be easily created between the back plate and the abutment surface of the equipment used for making the retaining elements. These clearances are further accentuated by the wear of the equipment. Because of these circumstances, in addition to possible errors of alignment of the back plate, the forces applied during cutting may deform the back plate flank which is in abutment against the counter-surface. The obtained back plate may therefore sometimes have a quality that is insufficient and must therefore be discarded.

A second kind of equipment provides tools arranged mutually parallel which act simultaneously by approaching the back plate from opposite flanks. Usually tools of even order approach from one flank and those of odd order approach from the opposite flank. This arrangement makes it unnecessary to provide a counter-surface. This method ensures a better result than the first described method. The forces applied to the surface of the back plate by a first order of tools, for instance tools of even order, are indeed counteracted by the tools of the other order, of the odd order in the example, and therefore there are no deformations of the peripheral flanks of the back plate. However, this second manufacturing method, too, is not free from drawbacks.

First of all, this kind of manufacturing, because of the curvilinear or broken, and in any case usually irregular contour of the lateral flanks of the back plate, does not allow to easily make retaining elements in the proximity of the perimeter of the back plate. On the other hand, it is in any case necessary to avoid protrusions or grooves so close to the perimeter that they are only partially embedded in the friction material or are even outside it. This circumstance would indeed create a zone of weakness for the adhesion of the friction material to the back plate and must therefore be avoided. For the aforesaid reasons the currently manufactured back plates usually have a usually continuous peripheral zone provided within the perimeter of the engaging portion and delimited towards the outside by said perimeter, in which zone there is no optimal distribution of the retaining elements. In the back plates of the prior art, the width of said zone is often too great, at least in some parts of the back plate, and in this case it may cause breaking and detachment of the friction material.

It is therefore a further object of the invention to provide a method for obtaining an optimal distribution of the retaining elements even in the proximity of the perimeter of the engaging portion defined on the engagement surface of the back plate.

A not least object of the invention is to provide a back plate and a method for manufacturing the same that can be obtained at low costs and are therefore suitable for large-scale industrial production.

SUMMARY OF THE INVENTION

These and other objects are attained with the back plate and the method for manufacturing the same as claimed in the appended claims.

A preferred embodiment of the invention provides a back plate having a series of transverse rectilinear parallel rows of retaining elements for engaging a friction material. Each retaining element comprises a protrusion and a groove associated to the protrusion and adjacent thereto. The groove has an elongated shape and a substantially constant width. The groove has a bottom wall that may include a flat section and a section inclined along the groove axis. The protrusion has a width, measured perpendicularly to the groove axis, substantially constant from a proximal end to the free distal end. Said width of the protrusion corresponds substantially to the width of the adjacent groove, still measured perpendicularly to the groove axis. The protrusion extends towards the outside starting from the plane of the engagement surface of the back plate and has a shape substantially curved in the direction of the groove axis, typically a curl-like shape or shaving-like shape, determined by the shape of the cutting edges of the tool that makes the groove.

According to a main aspect of the invention, on the engaging portion of the back plate there is provided at least one first series of parallel rows of retaining elements, wherein the first adjacent elements of each row, i.e. those arranged adjacent to the perimeter of the engaging portion, are arranged at the same distance from said perimeter, measured along the axis of the rows. Preferably this condition is applied to the majority of the rows of retaining elements provided in the engaging portion and even more preferably to all of the rows.

Said distance is further advantageously chosen so as to reduce to a minimum the width of the peripheral zone free of retaining elements and will therefore advantageously be in the order of millimeter and even more advantageously will be less than 2.0 mm.

According to a particular aspect of the invention, the aforesaid condition occurs at both ends of the rows of retaining elements, wherein the constant distance can however be different at the two ends.

According to a further aspect of the invention, on the engaging portion of the engagement surface of the back plate there are provided at least two series of parallel rows of retaining elements. The rows are further parallel and preferably mutually alternate, so that the rows of a first series are adjacent to the rows of a second series different from the first one.

According to a preferred embodiment of the invention, the retaining elements are further oriented in such a way that in each row of retaining elements the retaining element closest to the perimeter of the engaging portion defined on the engagement surface of the back plate, i.e. the first one that is encountered from the periphery of the back plate towards the center of the back plate along the axis of the row, is oriented with the protrusion axially towards he outside of the plate, i.e. towards the lateral flank of the back plate and therefore with the groove oriented towards the inside, i.e. towards the center of the back plate. Furthermore, preferably, this condition is applied to both first two opposite elements of each row and, still according to a preferred embodiment of the invention, to the majority of or all of the rows of retaining elements.

The back plate according to the invention is adapted to be used for manufacturing a brake pad intended for a disc brake assembly. The invention, however, can also be applied to brakes of a different kind, with or without appropriate modifications to the back plate and to the retaining elements.

The provision of first retaining elements arranged at constant distance from the perimeter delimiting the engaging portion defines a distribution of said first retaining elements over a pathway that is parallel to said perimeter and therefore essentially reproduces the contour of said perimeter. Furthermore, when the retaining elements are uniformly distributed within the parallel rows, said elements, too, will have a distribution that reproduces the contour of said perimeter.

Advantageously, thanks to the fact that the protrusions are distributed according to a contour that follows the contour of the friction material, a better heat exchange is obtained between the friction material and the back plate through which the generated heat is dissipated.

According to a particular aspect of the invention, the groove and the corresponding protrusions have a rectangular cross-section with respect to the groove axis. In this way the side walls of the groove and the side walls of the corresponding protrusion will be substantially perpendicular to the plane of the engagement surface of the back plate on which the retaining elements are provided and parallel to the axis of the rows of retaining elements. This shape of the grooves and of the protrusions is advantageous for retaining the friction material, unlike the triangular or rounded shapes of the prior art, which are instead less effective.

Advantageously, according to the invention the retaining elements are arranged along parallel lines transversely oriented on the surface of the back plate that has to receive the friction material, i.e. in the direction of the width, and can therefore be made by using compact equipments working from opposite flanks of the back plate, without any deformations occurring in the flanks themselves.

BRIEF DESCRIPTION OF THE DRAWINGS

Some embodiments of the invention will be given by way of non-limiting example with reference to the attached drawings, in which:

FIGS. 7A and 7B are enlarged views of a detail of FIG. 6.

DESCRIPTION OF SOME PREFERRED EMBODIMENTS OF THE INVENTION

Figure 1:
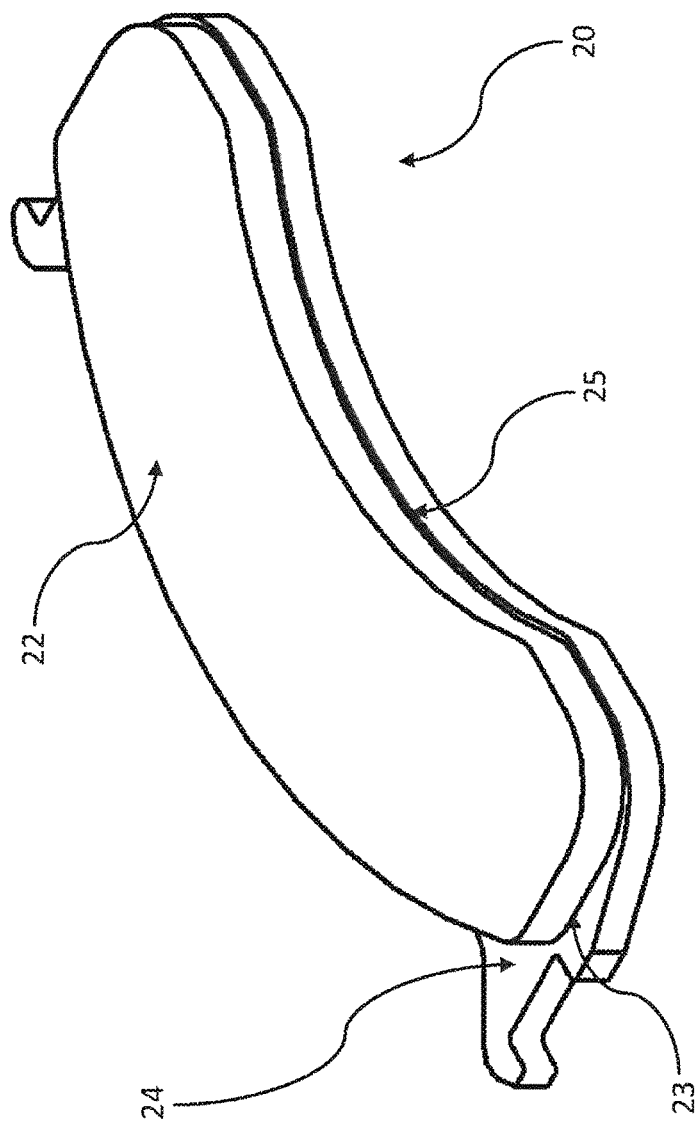
FIG. 1 is a top perspective view of a brake pad incorporating the back plate according to a preferred embodiment of the invention.

The invention will now be described with reference to the appended figures, in which identical reference numerals are used for identifying identical or functionally equivalent elements.

FIG. 1 shows an overall view of a brake pad 20 of conventional shape. The brake pad 20 comprises a friction material 22 applied to a back plate 24.

The friction material 22 may comprise any material having properties suitable for generating friction. In an embodiment, the friction material 22 consists of phenolic resins loaded with iron powders, steel powders or carbon fibers and/or carbon powders. The friction material 22 is applied to the back plate 24 by means of known methods, for instance by deposition of material in a molten state. The friction material 22 is firmly fixed to one of the faces of the back plate 24, so as to cover a portion extending preferably over most of the surface of said face of the back plate 24. The thickness of the layer of the friction material 22 depends on the kind of brake pad and its intended use. The layer of friction material 22 is usually surrounded by a peripheral zone 25 which is free from friction material and whose width varies along the perimeter of the brake pad 22 and depends on the kind of brake pad. In the example shown said peripheral zone 25 surrounds, without interruption, the layer of friction material 22.

The back plate 24 is made of metal, a metal-based composite material or any other material that is suitable for the purpose and can be worked according to the method described here below in this specification. The thickness and shape of the illustrated back plate 24 are conventional and the back plate may comprise openings and other structural elements known in the field, in order to enable the brake pad 20 to be mounted in a disc brake assembly (not shown).

Figure 2:
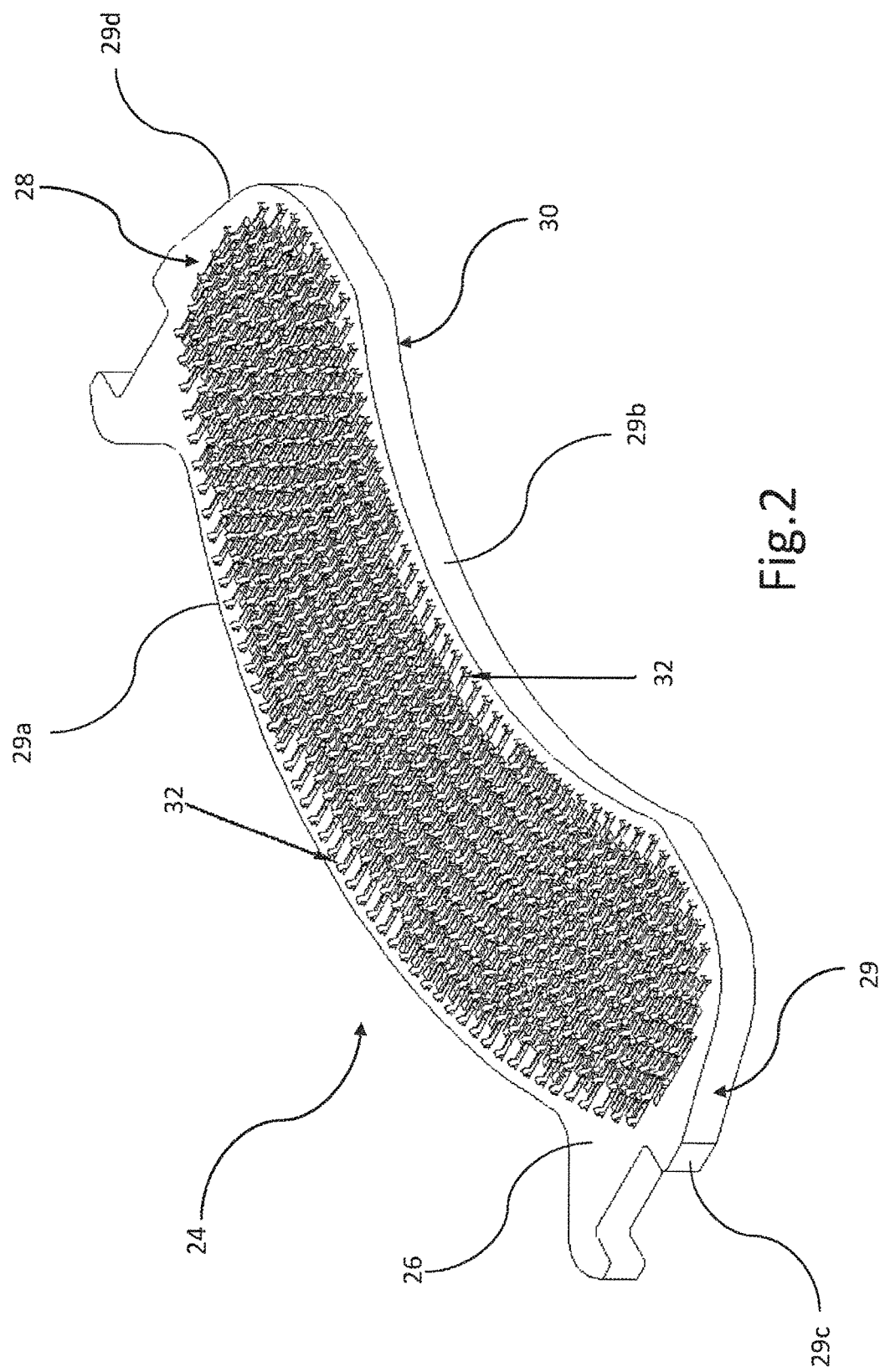
FIG. 2 is a top perspective view of back plate according to a preferred embodiment of the invention.
Figure 3:
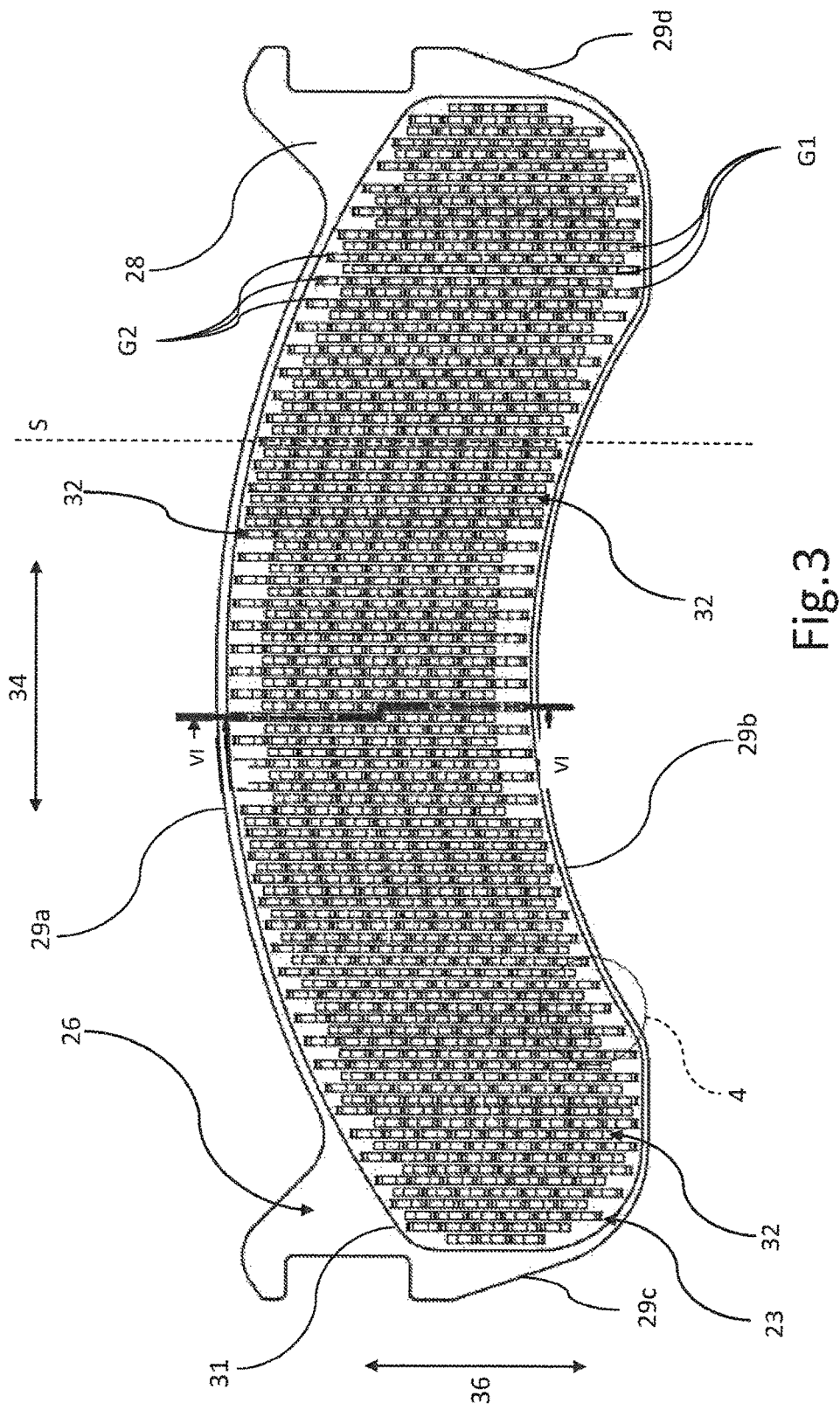
FIG. 3 is a top plan view of the back plate according to FIG. 2.

With reference to FIGS. 2 and 3, the back plate 24 comprises a body 26 having an upper surface, or first surface 28, and a lower surface, or second surface 30. The space comprised between the first 28 and the second 30 surfaces determines the thickness of the back plate 24. Lateral flanks 29 surround the pair of opposite surfaces 28, 30. Said lateral flanks 29 comprise a first longitudinal flank 29a, a second longitudinal flank 29b, a first transverse flank 29c and a second transverse flank 29d.

In the embodiment shown, the opposite surfaces 28, 30 are parallel to each other and the lateral flanks 29 are perpendicular to said surfaces.

An engaging portion 23 for the friction material is defined on the first surface 28. The engaging portion 23 comprises a plurality of retaining elements 32 for engagement with the friction material 22, when the latter is applied onto the back plate. When the friction material 22 is applied onto the back plate 24, said material covers the portion 23 and overlaps the same, without, however, extending beyond said engaging portion. Therefore the perimeter 31 of the portion 23 will coincide with the perimeter of the layer of friction material 22 when the latter is applied to the back plate 24 during manufacturing of the brake pad 20. Still during manufacturing of the brake pad, one or more zones inside said perimeter 31, also non adjacent to the perimeter 31, may possibly stay free of friction material and have openings, depending on the applications. Said perimeter 31 may further coincide either partially or completely with the perimeter of the back plate 24. The zone comprised between the perimeter 31 and the perimeter of the back plate 24, when existing, further corresponds to the zone free of friction material indicated in FIG. 1 with the reference numeral 25.

During braking the brake pad 20 is exposed to a shear force that tends to cause detachment of the friction material 22 from the first surface 28 of the back plate 24 to which the friction material 22 adheres. In the case of the back plate 24 illustrated, the shear force develops mainly over the length of the back plate, or in longitudinal direction, indicate by arrows 34 in FIG. 3.

Figure 4:
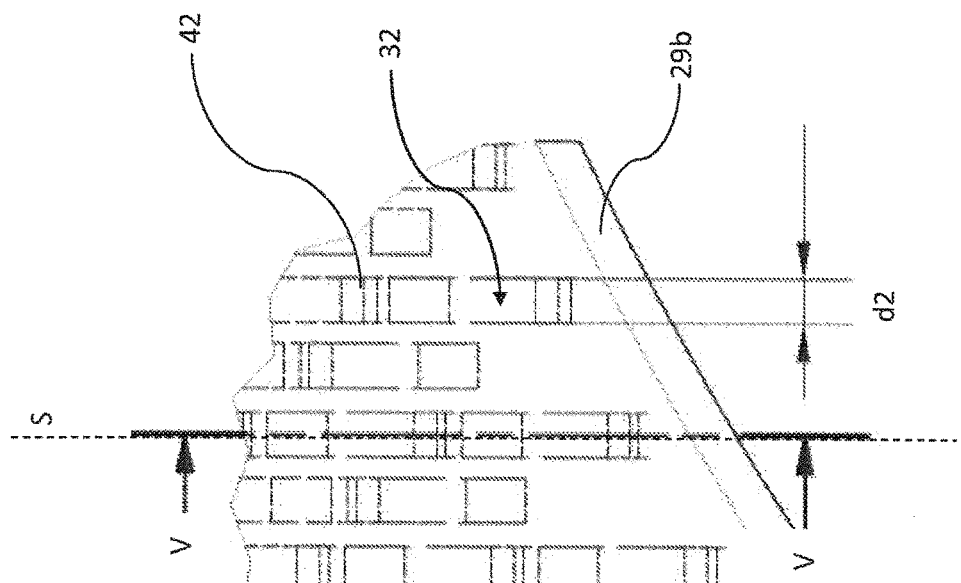
FIG. 4 is an enlarged view of a detail of FIG. 3.
Figure 5:
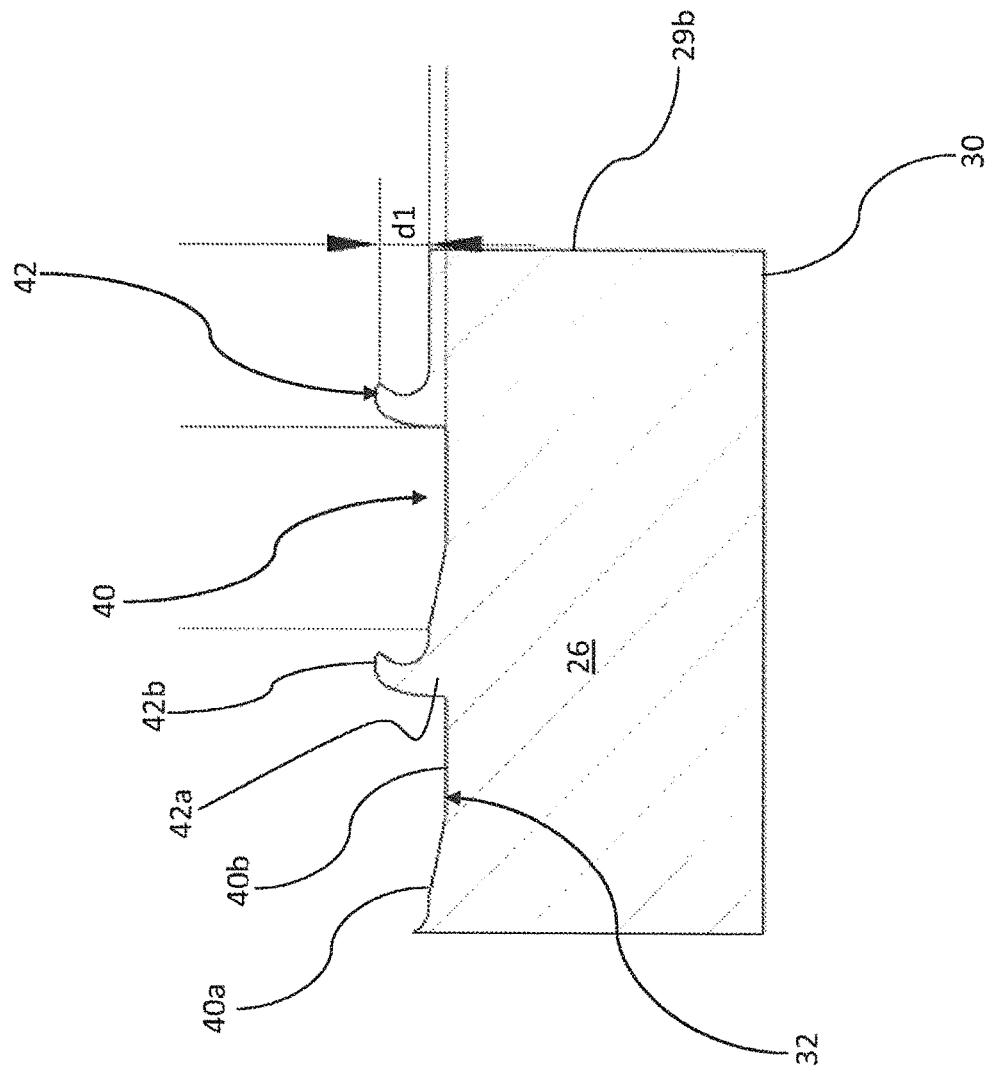
FIG. 5 is a sectional view along the line V-V of FIG. 4.

Referring now to FIGS. 4 and 5, each retaining element 32 comprises a groove 40 and a protrusion 42 adjacent to the groove 40. The groove 40 is defined in the first surface 28 of the plate body 26, adjacent to the associated protrusion 42. The protrusion 42 extends towards the outside of the first surface 28, i.e. upwards, over the plane of the first surface 28, as can better be seen in the representation of FIG. 5.

The protrusion 42 comprises a proximal end 42a and a free distal end 42b. The protrusion 42 has substantially a constant width measured from the proximal end 42a to the distal end 42b. The typical width of the protrusion 42 substantially ranges between about 1.5 mm and 2.5 mm. The protrusion 42 can be curved or rounded along its length going from the proximal end 42a to the distal end 42b. The protrusion 42 may therefore have the shape of a rounded curl or shaving projecting frontally out of the associated groove 40.

The protrusions 42 form an integral part of the plate body 26 and are made up by the material removed from the adjacent groove 40. The grooves 40 and the protrusions 42 are made by means of a process of plastic deformation obtained by means of tools provided with teeth or cutting edges and mounted on an equipment of a kind which is known per se and is therefore not further described.

The shape and size of the retaining elements 32 and in particular of the groove 40 and of the protrusion 42 may vary depending on the equipment and on the shape of the tools used for the making of the retaining elements 32.

The protrusions 42 can have any length suitable for the purpose of making the friction material 22 adhere or of retaining the same and of counteracting the forces and vibrations that are applied during braking. The height "d1" of the protrusions 42, measured along the perpendicular starting from the plane of the first surface 28 at the distal end 42b, preferably ranges from 0.7 mm to 2.0 mm in the case of brake pads for light vehicles and from 1.0 to 2.5 mm in the case of brake pads for heavy vehicles.

The groove 40 substantially has an elongated shape with substantially constant width. The width "d2" of the groove 40 further preferably corresponds to the width of the protrusion 42 associated thereto. The groove 40 has a bottom wall that may include an inclined section 40a and a flat section 40b, the latter being substantially parallel to the plane of the first surface 28. The maximum depth of the groove 40 with respect to the plane of the surface 28 may further be for instance approximately 0.5-2.0 mm.

As better visible in FIG. 4, according to a particular aspect of the invention, the groove 40 and the corresponding protrusions 42 have a rectangular cross-section with respect to the groove axis. In this way the side walls of the groove and the side walls of the corresponding protrusions 42 will be substantially perpendicular to the plane of the engagement surface 28 of the back plate 24 on which the retaining elements 32 are provided and will be parallel to the axis "S" of each row of retaining elements. This shape of the grooves 40 and of the protrusions 42 is advantageous for retaining the friction material 22, unlike what happens with the triangular or rounded shapes of the prior art, which are instead less effective.

Referring again to FIG. 3, it is preferable that each retaining element 32 is oriented in such a way that the groove 40 extends along a direction parallel to the width of the back plate 24, or transvers direction, indicated by arrows 36, perpendicular to the direction 34 of main application of the shear forces during braking. This arrangement of the grooves 40 allows to make the retaining elements 32 by means of an equipment smaller than the one that would be necessary if the grooves 40 were oriented along the longitudinal direction, i.e. along the length of the back plate 24. In other embodiments it will in any case be possible to provide orientations of the grooves 40 different from the illustrated orientation.

According to the invention, the retaining elements 32 are arranged on the engaging portion 23 of the first surface 28 of the back plate 24, with a density and according to a pattern that allow to appropriately retain the friction material 22 while maintaining unaltered the structural characteristics of the back plate 24.

Figure 6:
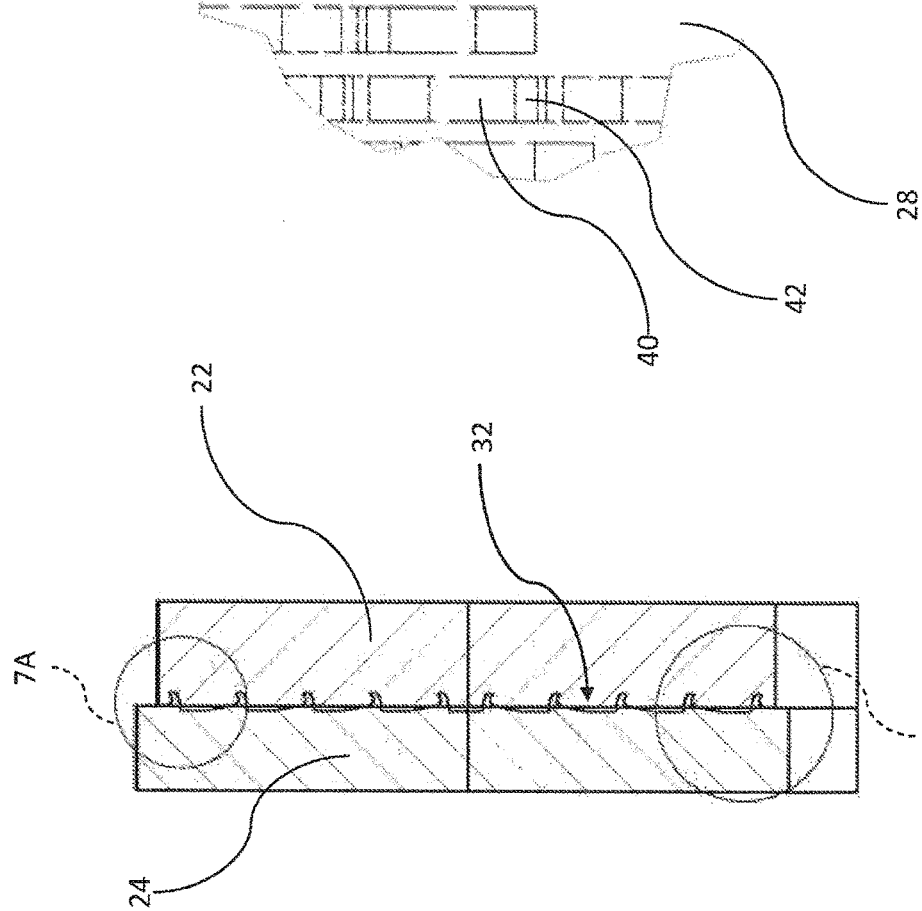
FIG. 6 is a sectional view along the line VI-VI of FIG. 3.

With reference also to FIGS. 6 and 7A and 7B, according to the invention, said engaging portion 23 is provided with at least one first series G1 of transverse rectilinear parallel rows of retaining elements 32. The retaining elements 32 of the rows of the series G1 have the distance "d3", measured along the axis "S" of each row, between the retaining elements 32 mutually adjacent and closest to the perimeter 31 of said engaging portion 23 and said perimeter 31, which distance is constant.

In a preferred embodiment of the invention, this condition occurs at both ends of the rows of retaining elements 32 of said first series G1.

According to the invention, said distance "d3" is further advantageously in the order of millimeter and preferably less than 2.0 mm.

As it can be appreciated by comparing FIGS. 7A and 7B, in the embodiment shown, said constant distance "d3" measured in the proximity of the first longitudinal flank 29a is essentially identical with the distance measured at the second longitudinal flank 29b. However, the width "d4" of the zone 25 free from the friction material 22 is different when it is measured in the proximity of said two opposite longitudinal flanks 29a, 29b. In other embodiments the constant distance "d3", measured at one end of the rows, can however be different from the one measured at the opposite end and also the width "d4" of the zone 25 can be the same at both ends.

Therefore, in the embodiment shown, the first retaining elements 32 mutually adjacent and adjacent to the first longitudinal flank 29a of the back plate 24 will be aligned along a first pathway and the first retaining elements 32 mutually adjacent and adjacent to the second longitudinal flanks 29b of the back plate 24 will be aligned along a second pathway, said first and second pathways being parallel to the corresponding adjacent section of the perimeter 31.

In the embodiment shown, the axis "S" of the rows of retaining elements 32 extends in transverse direction. According to this arrangement the distance between the retaining elements 32 proximal to the perimeter of the back plate 24 and the perimeter of the back plate is given by the sum of the distance "d3", between the retaining elements 32 proximal to the perimeter 31, and the width "d4" of the zone 25 free from friction material on the surface 28, measured along the same axis "S".

According to the embodiment shown, the retaining elements 32 are oriented in such a way that in each row of retaining elements, the retaining element 32 closest to the perimeter of the back plate 24, i.e. the first one that is encountered from the outside of the back plate 24 towards the center of the back plate along the axis "S" of the row of retaining elements 32, is oriented with the protrusion 42 towards the outside of the back plate, i.e. towards the perimeter 31 of the engaging portion of the back plate 24 and therefore with the groove 40 towards the inside, i.e. towards the center of the back plate 24.

Moreover, this condition is preferably applied to both ends of the rows of retaining elements 32 belonging to the first series G1.

The embodiment shown further comprises a second series G2 of rectilinear parallel transverse rows of retaining elements 32, in which the distance measured along the axis "S" of each row, between adjacent retaining elements 32 closest to the perimeter 31 of said engaging portion 23 and said perimeter 31 is constant. Said constant distance of the second series G2 is however different from the constant distance of the first series G1. The parallel rows of the first series G1 will alternate with the parallel rows of the second series G2.

In other embodiments it will be possible to provide also more than two series of parallel rows of retaining elements, each series being subjected to the condition according to which the distance measured along the axis "S" of each row, between mutually adjacent retaining elements 32 closest to the perimeter 31 of said engaging portion 23 and said perimeter 31 is constant. Preferably the rows of the various series G1, G2, . . . Gn will alternate with one another in a sequential way.

The back plate and the method for the manufacturing thereof as described and illustrated are open to several variants and modifications, falling within the same inventive principle.

The invention claimed is:

1. A back plate for a brake pad of a disc brake assembly, comprising:
    a plate body provided with a pair of opposite surfaces and lateral flanks, said lateral flanks including an outer radial longitudinal flank that is concave at least along a portion thereof and an opposite inner radial longitudinal flank that is convex at least along a portion thereof thereby providing the plate body with an irregular contour,
    an engaging portion for a friction material being defined on a first one of said surfaces of said plate body and being delimited by a perimeter which coincides with a perimeter of a layer of the friction material when the latter is applied to the back plate, the perimeter of the engaging portion having an irregular contour including concave and convex portions,
    said engaging portion being provided with at least a first series of rectilinear parallel rows of retaining elements and a second series of rectilinear parallel rows of retaining elements for said friction material, the rows of said first series being parallel to and alternating with the rows of said second series, and the retaining elements being uniformly distributed in each of the rows of the first and second series,
    said rows of said first and second series being arranged along a transverse direction perpendicular to a longitudinal direction tangent to the direction of the circular motion of the disc to be braked and each row of said first and second series comprising a plurality of grooves associated to corresponding protrusions, said protrusions being provided with a proximal end integrally connected to the material of the plate body and a free distal end,
    the retaining elements of said first series being oriented such that a protrusion of a retaining element closest to the perimeter of the engaging portion of the plate body adjacent the inner radial longitudinal flank of the plate body extends closer to the perimeter of the engaging portion than any groove of the retaining elements within the engaging portion,
    the retaining elements of said second series being oriented such that a protrusion of a retaining element closest to the perimeter of the engaging portion of the plate body adjacent the outer radial longitudinal flank of the plate body extends closer to the perimeter of the engaging portion than any groove of the retaining elements within the engaging portion,
    wherein the retaining elements closest to the perimeter of said engaging portion being distributed over a pathway which reproduces the irregular contour thereof,
    wherein said first and second series of rectilinear rows of retaining elements comprises a majority of the rows of retaining elements provided in the engaging portion, and
    wherein, for each row of said first series, a distance measured along an axis of each row between the retaining elements closest to the perimeter of said engaging portion adjacent the inner radial longitudinal flank of the plate body and said perimeter is constant and less than 2.0 mm, and for each row of said second series, a distance measured along an axis of each row between the retaining elements closest to the perimeter of said engaging portion adjacent the outer radial longitudinal flank of the plate body and said perimeter is constant and less than 2.0 mm.

2. The back plate according to claim 1, wherein the grooves of said first and second series and the corresponding protrusions have a rectangular cross-section, whereby side walls of the grooves and side walls of the corresponding protrusions are substantially perpendicular to a plane of the engaging portion of the plate body on which the retaining elements are provided and parallel to the axis of each row of retaining elements.

3. A brake pad for a disc brake assembly, comprising a friction material, characterized in that the brake pad includes a back plate according to claim 1.

4. Method for making a back plate for a brake pad of a disc brake assembly, said method comprising the steps of:
    providing a plate body provided with a pair of opposite surfaces and lateral flanks, said lateral flanks including an outer radial longitudinal flank that is concave at least along a portion thereof and an opposite inner radial longitudinal flank that is convex at least along a portion thereof thereby providing the plate body with an irregular contour,
    defining, on a first one of said surfaces, an engaging portion for a friction material delimited by a corresponding perimeter which coincides with the perimeter of a layer of friction material when the latter is applied to the back plate, the perimeter of the engaging portion having an irregular contour including concave and convex portions;
    obtaining, on said engaging portion, at least first and second series of rectilinear parallel rows of retaining elements for said friction material, the rows of said first series being parallel to and alternating with the rows of said second series, the retaining elements being uniformly distributed in each of the rows of the first and second series, said rows being arranged along a transverse direction perpendicular to a longitudinal direction tangent to the direction of the circular motion of the disc to be braked and each row comprising a plurality of grooves associated to corresponding protrusions which are defined by the material deriving from the making of the corresponding grooves and are provided with a proximal end integrally connected to the material of the plate body and a free distal end,
    wherein the retaining elements of said first series being oriented such that a protrusion of a retaining element closest to the perimeter of the engaging portion of the plate body adjacent the inner radial longitudinal flank of the plate body extends closer to the perimeter of the engaging portion than any groove of the retaining elements within the engaging portion,
    wherein the retaining elements of said second series being oriented such that a protrusion of a retaining element closest to the perimeter of the engaging portion of the plate body adjacent the outer radial longitudinal flank of the plate body extends closer to the perimeter of the engaging portion than any groove of the retaining elements within the engaging portion,
    wherein the retaining elements closest to the perimeter of said engaging portion being distributed over a pathway which reproduces the irregular contour thereof, wherein said first and second series of rectilinear rows of retaining elements comprises a majority of the rows of retaining elements provided in the engaging portion, and wherein, for each row of said first series, a distance measured along an axis of each row between the retaining elements closest to the perimeter of said engaging portion adjacent the inner radial longitudinal flank of the plate body and said perimeter is constant and less than 2.0 mm and for each row of said second series, a distance measured along an axis of each row between the retaining elements closest to the perimeter of said engaging portion adjacent the outer radial longitudinal flank of the plate body and said perimeter is constant and less than 2.0 mm.

* * * * *